United States Patent [19]
Walker

[11] Patent Number: 6,136,077
[45] Date of Patent: Oct. 24, 2000

[54] STEAM ABSORPTION APPARATUS

[76] Inventor: David R. Walker, 2209 Lagoon Dr., League City, Tex. 77573

[21] Appl. No.: 09/187,013

[22] Filed: Nov. 5, 1998

[51] Int. Cl.⁷ .................................................. B01D 45/14
[52] U.S. Cl. .................................. 96/380; 96/384; 96/385; 96/388; 55/385.3
[58] Field of Search .......................... 96/188, 228, 311, 96/321, 356, 380, 384, 385, 388, 383, 386; 261/DIG. 54, DIG. 76; 55/385.3; 123/198 E

[56] References Cited

U.S. PATENT DOCUMENTS

| | | | |
|---|---|---|---|
| 1,702,804 | 2/1929 | Winslow | 96/321 |
| 2,452,723 | 4/1948 | Bourne et al. | 96/384 |
| 2,587,416 | 2/1952 | Vedder | 96/321 |
| 3,739,556 | 6/1973 | Waters | 96/356 |
| 4,047,910 | 9/1977 | Krockta | 96/321 |
| 4,050,913 | 9/1977 | Roach | 96/385 |
| 4,187,087 | 2/1980 | Whitescarver . | |
| 4,437,867 | 3/1984 | Lerner | 96/356 |
| 4,853,014 | 8/1989 | Bloch . | |
| 4,880,447 | 11/1989 | Bloch . | |
| 4,921,546 | 5/1990 | Bloch . | |
| 4,922,937 | 5/1990 | Bloch . | |
| 5,020,328 | 6/1991 | Bronicki . | |
| 5,134,977 | 8/1992 | Bagger et al. | 96/388 |
| 5,178,654 | 1/1993 | Cowley et al. | 96/356 |
| 5,230,725 | 7/1993 | Chowaniec | 96/356 |
| 5,300,131 | 4/1994 | Richard | 96/356 |
| 5,626,651 | 5/1997 | Dullien | 96/356 |
| 5,662,721 | 9/1997 | Bresowar | 96/356 |
| 5,912,370 | 6/1999 | McConkey | 55/285.3 |

*Primary Examiner*—David A. Simmons
*Assistant Examiner*—Minh-Chau T. Pham
*Attorney, Agent, or Firm*—Keeling Law Firm

[57] ABSTRACT

An apparatus which absorbs gas that has been discharged from a pipe at a high velocity and which releases the gas to the atmosphere at a reduced velocity and with relatively low noise. The apparatus includes a container which has a container interior, a container inlet through which the gas enters the container interior, and a container outlet, preferably located at the top of the container, through which the gas is released to the atmosphere. The container further includes a container expanded section and a container main section. The container expanded section, which acts to reduce the velocity of the gas, is located intermediate the container inlet and the container main section and has an inner surface cross-sectional area which expands from the container inlet to the container main section. The container also includes deflector vanes for diverting the flow of the gas within the container interior towards the container outlet. The deflector vanes provide the gas flow with a smooth and gradual transition from the container inlet to the container outlet thereby enhancing the flow characteristics and properties of the gas flow within the container and reducing the vibrations and noise level associated with high velocity gas flow and speed reduction. In the preferred embodiment, deflector vanes are attached within the container interior to divert the flow of gas, each vane preferably attached at an angle from horizontal ranging from 20 to 50 degrees.

24 Claims, 3 Drawing Sheets

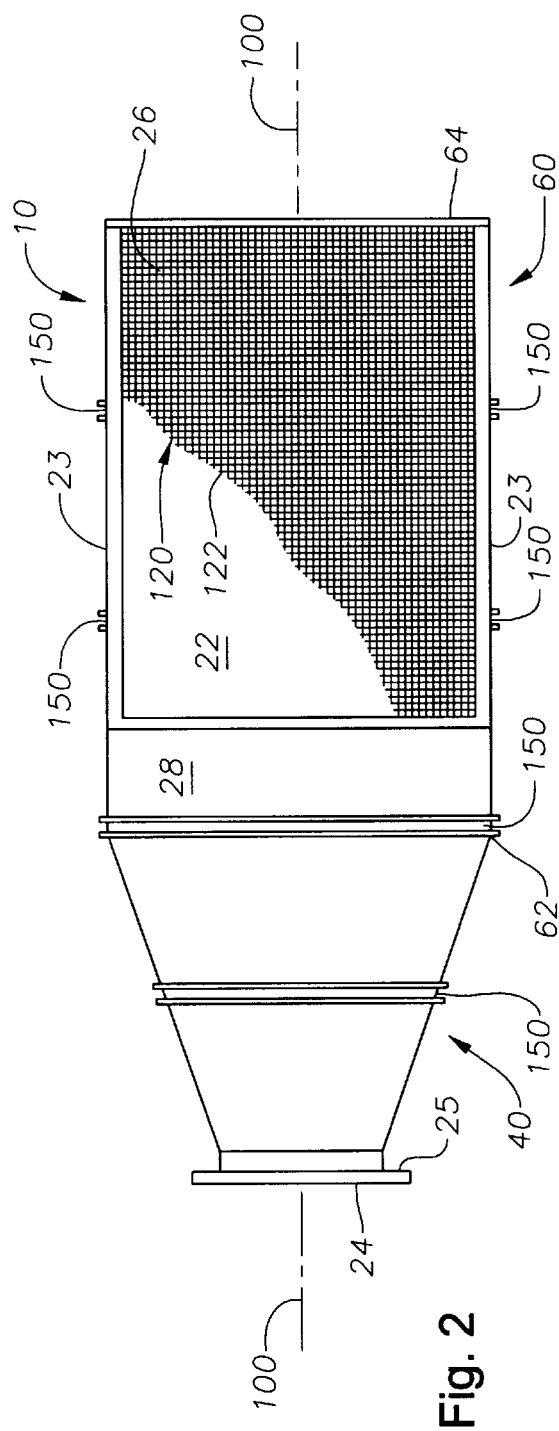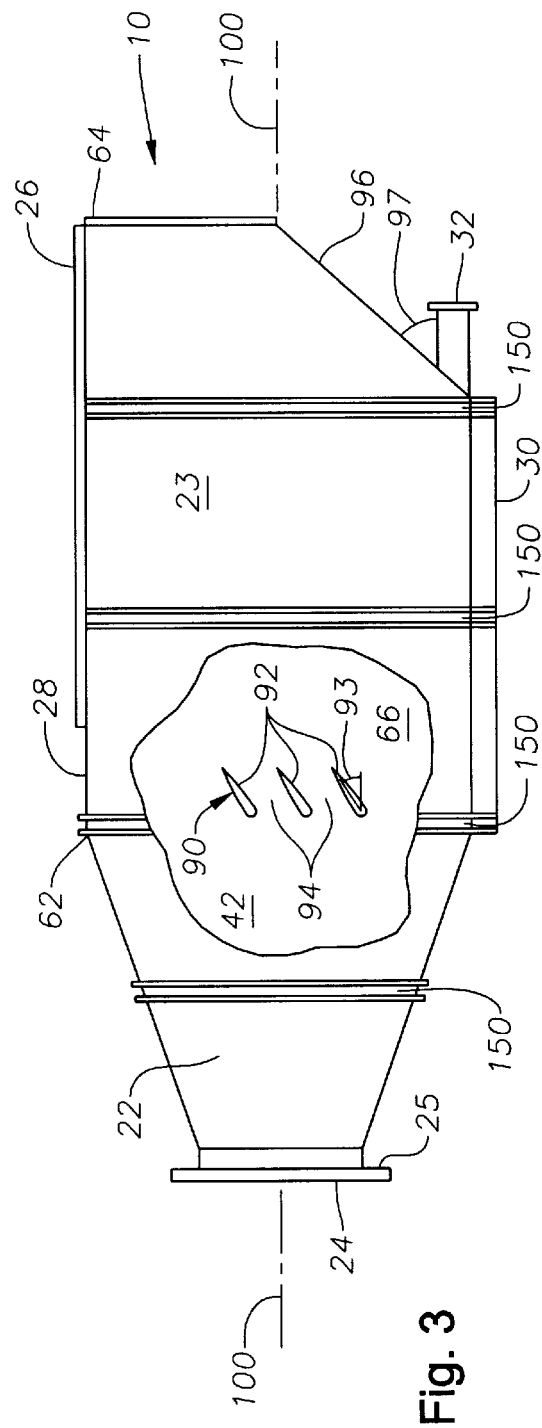

STEAM ABSORPTION APPARATUS

BACKGROUND OF THE INVENTION

1. Field of Invention

The present invention relates generally to an apparatus which absorbs a high velocity gas that has been discharged from a pipe and which releases the gas to the atmosphere. More specifically, the present invention relates to such an apparatus which reduces the velocity of the gas flowing therethrough, blocks the discharge of most solid fragments entrained in the gas flow from flowing out into the atmosphere, and gradually diverts the gas flow from the inlet to the outlet of the apparatus thereby enhancing the efficiency of the apparatus and the gas flow properties and characteristics within the apparatus.

2. Related Art

The present invention may be specifically used during the process of steam cleaning a pipe or conduit at an industrial plant or similar commercial facility. During the steam cleaning process, steam is introduced through the relevant pipe at a high velocity. The high velocity steam flow serves to fluidize or remove any solid particles, such as scale, construction debris, or process build-up, that have built up or have been deposited throughout the interior of the pipe. As the solid particles are dislodged, they become entrained and exit the pipe along with the steam flow. An apparatus related to the present invention is normally connected to the outlet of the pipe so as to receive the steam flow and any entrained solid particles, and to vent the steam flow to the atmosphere.

In general, in order for the steam cleaning of a pipe to be effective, the velocity of the steam within the pipe must be sufficiently high to generate a turbulent flow adjacent the pipe interior. Such a turbulent flow creates cavitation along the pipe interior which generates powerful local forces that act to dislodge and/or break away the solid particles therefrom. However, the steam velocities that are required to create this turbulent flow and cavitation generate a significant amount of noise, particularly at the outlet of the pipe, by way of near-sonic or sonic compression waves. The significant amount of noise created by the high velocity steam is, in turn, dangerous to the health of nearby operators. Thus, it would be beneficial to the prior art to provide a means by which to reduce the noise level generated by the typical steam cleaning operation.

Some prior art mechanical silencers which can be purchased in the industry are able to reduce the noise level of the steam cleaning process. However, the operation of some of these silencers results in the creation of a pressure within the silencer. The existence of this internal pressure in turn results in the pipe steam flow being somewhat backed up which itself reduces the volumetric flow rate of the steam in the pipe being cleaned. A high volumetric steam flow rate is generally preferred. Thus, it would be beneficial to the prior art to provide an apparatus which reduces the noise level generated by the typical cleaning operation and which maintains a high volumetric steam flow rate therethrough.

U.S. Pat. Nos. 4,853,014, 4,880,447, 4,921,546, and 4,922,937, each issued to Bloch, and U.S. Pat. No. 4,187,087 issued to Whitescarver illustrate an apparatus that includes an expanded section and a means for injecting a decelerating fluid into the steam flow to reduce the velocity of the steam prior to it being vented into the atmosphere. Generally, adjacent the outlet of the pipe being cleaned, the steam is directed to the expanded section of the apparatus. As the steam flows through the expanded section, the velocity of the steam substantially decreases. Moreover, proximate the expanded section, a decelerating fluid, typically water, is injected into the steam flow. The injection of a liquid such as water into the steam flow also acts to slow down the steam flow. The deceleration of the steam caused by the expanded section and by the injection of water in turn results in a reduction of the noise level of the process. Furthermore, because the mechanisms which produce the noise level reduction are located proximate to the pipe outlet, the reduction in noise level is generated without sacrificing the high velocity steam flow required to properly clean the pipe interior.

The Bloch family of patents (U.S. Pat. Nos. 4,853,014, 4,880,447, 4,921,546, and 4,922,937), however, disclose an expanded section which tangentially feeds into a cylindrical tank with an open top. The manufacture of such a cylindrical tank requires a rolling operation in order to provide the tank with its cylindrical shape. In addition, the tangential feed into the cylindrical tank requires close tolerance fittings for the relevant elements. The rolling operation and the necessary close tolerance fittings are relatively expensive items. It would thus be beneficial to the prior art to provide an apparatus which is relatively less expensive to manufacture than those in the prior art.

In addition, the Bloch family of patents does not disclose an apparatus which gradually diverts the steam from the pipe outlet to the apparatus outlet. The Bloch apparatus is designed to provide as much contact as possible between the tank and the steam flow in order to increase the condensate removed from the steam prior to venting. The tangential influx of steam into the tank as well as the inclusion of horizontal baffles within the inner perimeter of the tank evidence the intended contact. The intended contact between the steam flow and the tank, however, leads to increased vibration and noise and to inefficient flow characteristics and properties for the steam within the tank. Enhancing the flow characteristics and properties of the steam within the apparatus would make the apparatus more efficient and would reduce the vibration and noise level of the process. It would thus be beneficial to the prior art to provide an apparatus which has a means for enhancing the flow characteristics and properties of the steam as the steam flows therethrough.

SUMMARY OF THE INVENTION

Accordingly, the objectives of this invention are to provide, inter alia, a new and improved apparatus that absorbs high velocity gas which has been discharged from a pipe, that releases the gas to the atmosphere, and that:

reduces the velocity of the gas as it flows therethrough;

reduces the noise level generated by the high velocity gas;

maintains a high volumetric flow rate therethrough;

is less expensive to manufacture than prior art systems;

has enhanced internal gas flow properties and characteristics as compared to prior art systems; and is more functionally efficient than prior art systems.

Other objectives will become apparent from time to time throughout the specification and claims as hereinafter related.

To fulfill such objectives, my invention comprises an apparatus which absorbs gas that has been discharged from a pipe at a high velocity and which releases the gas to the atmosphere at a reduced velocity and with relatively low noise. The apparatus comprises a container which includes a container interior, a container inlet through which the gas enters the container interior, and a container outlet, preferably located at the top of the container, through which the gas is released to the atmosphere. The container further includes a container expanded section and a container main section. The container expanded section, which acts to reduce the velocity of the gas, is located intermediate the container inlet and the container main section and has an inner surface cross-sectional area which expands from the container inlet to the container main section. The container also includes a means for diverting the flow of the gas within the container interior towards the container outlet. The means for diverting provides the gas flow with a smooth and gradual transition from the container inlet to the container outlet thereby enhancing the flow characteristics and properties of the gas flow within the container and reducing the vibrations and noise level associated with high velocity gas flow and speed reduction. In the preferred embodiment, the means for diverting comprises a plurality of deflector vanes attached within container interior, each preferably attached at an angle from horizontal ranging from 20 to 50 degrees.

BRIEF DESCRIPTION OF THE DRAWINGS

FIG. 2 is a top view of the container with the screen covering the container outlet partially removed.

FIG. 3 is a side elevational view of the container, partially cut-away revealing the container interior.

DETAILED DESCRIPTION OF THE INVENTION

Figure 1:
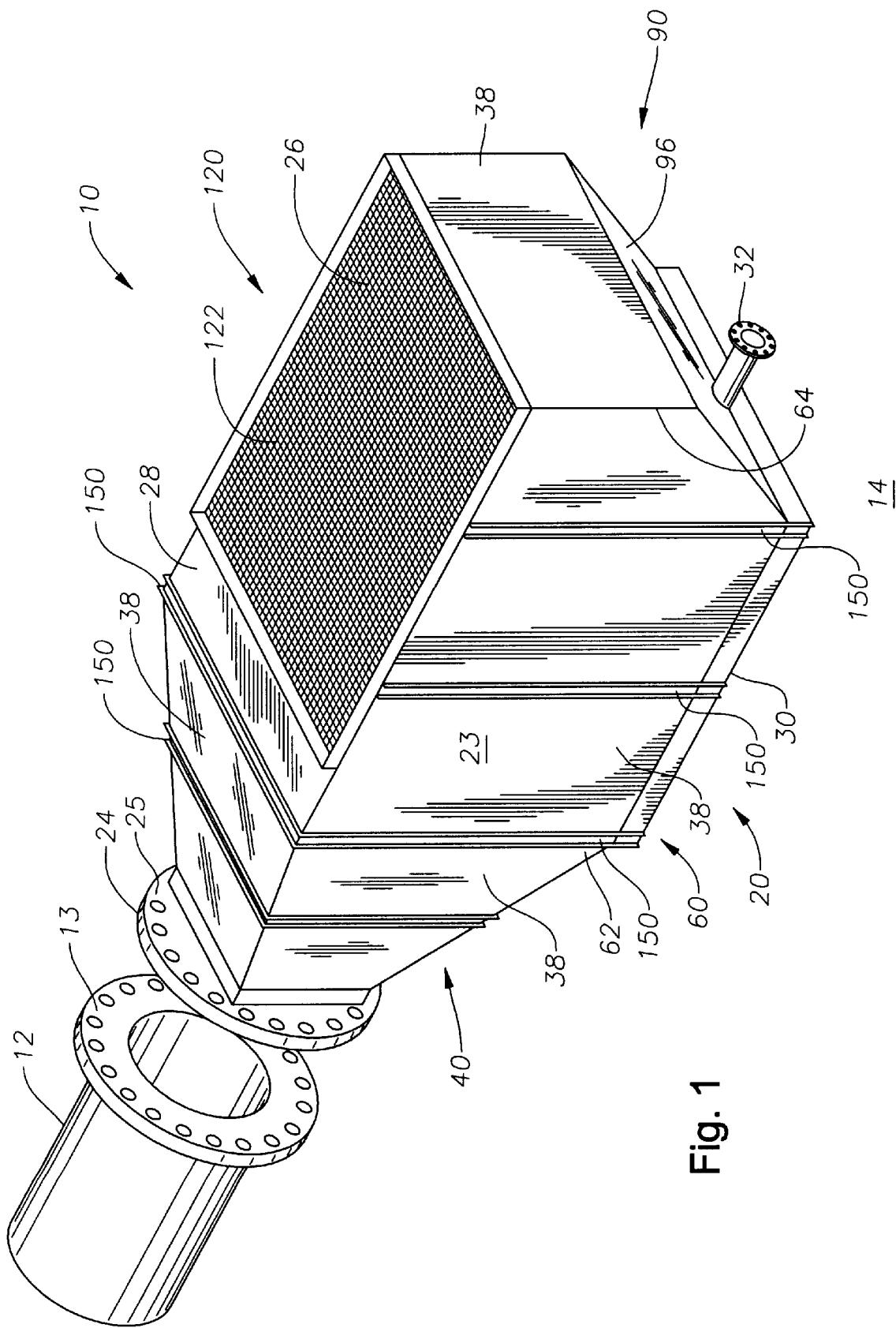
FIG. 1 is an isometric view of the container exploded from a pipe.
Figure 4:
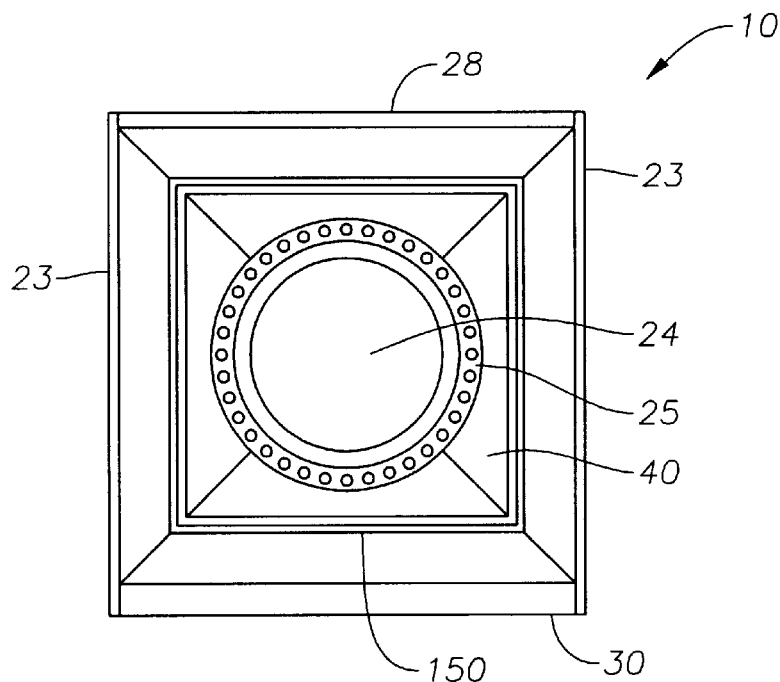
FIG. 4 is a front elevational view of the container.

The Steam Absorption Apparatus is generally shown in FIGS. 1–6 as 10. Apparatus 10 generally comprises a container 20 that includes a container inlet 24, a container outlet 26, a container expanded section 40, a container main section 60, and a means for diverting 90.

As previously disclosed, apparatus 10 absorbs high velocity gas that has been discharged from a pipe 12, reduces the velocity and substantial noise level associated with the high velocity gas, and releases the gas to the atmosphere. In general, the gas flows from the pipe 12, into the container 20 through the container inlet 24, and out of the container 20 through the container outlet 26. Although this specification will focus on the flow of steam through the container 20 as used in steam cleaning operations for pipes, it is understood that the container 20 may be used to absorb and discharge the high velocity flow of any number of gases and for any number of applications. Other relevant gases include air, nitrogen, and a mixture therof.

Container inlet 24 is preferably circular in shape and preferably includes a container inlet flange 25 to facilitate attachment to pipe 12, which itself typically includes a pipe flange 13. Thus, container inlet flange 25 is connected to pipe flange 13 thereby establishing fluid communication between pipe 12 and container 20.

Container 20 is at least partially hollow defining therein a container interior 22. Besides including container inlet 24 and container outlet 26, which are both in fluid communication with container interior 22, container 20 also includes a container top 28, a container bottom 30, and container sides 23. Container bottom 30 is proximate ground 14 whereas container top 28 is distal ground 14. Container sides 23 connect container bottom 30 to container top 28.

Container expanded section 40 is located proximate to container inlet 24 so that container expanded section 40 is intermediate container inlet 24 and container main section 60. Container expanded section 40 includes an expanded section inner surface 42 adjacent container interior 22. Expanded section inner surface 42, in turn, has a cross-sectional area that expands from container inlet 24 to container main section 60. In the preferred embodiment, the cross-sectional area of expanded section inner surface 42 gradually expands from container inlet 24 to container main section 60. Preferably, the cross-sectional area of expanded section inner surface 42 has a rectangular shape, although any of a number of shapes are also functional. In the preferred embodiment, container expanded section 40 and container inlet 24 have the same center line 100.

Container main section 60 includes a front end 62 and a rear end 64. Container main section front end 62 is proximate container expanded section 40. Container main section rear end 64 is distal container expanded section 40. Container main section 60 also includes a main section inner surface 66 which itself has a cross-sectional area. In the preferred embodiment, the cross-sectional area of main section inner surface 66 is uniform therethrough and is the same size and shape as the cross-sectional area of expanded section inner surface 42 taken at the junction between main section 60 and expanded section 40. Preferably, the cross-sectional area of main section inner surface 66 has a rectangular shape, although any of a number of shapes are also functional. Furthermore, in the preferred embodiment, main section 60 has the same center line 100 as expanded section 40 and container inlet 24.

In the preferred embodiment, container 20, including container expanded section 40 and container main section 60, is constructed from common steel. Specifically, container 20 is constructed from a plurality of flat common steel plates 38 which are welded together to provide the preferred rectangular inner cross-sectional area of container expanded section 40 and container main section 60. It is noted that the use of flat common steel plates 38 in the construction of container 20 is very cost-effective.

Container outlet 26 is located on container main section 60. In the preferred embodiment, container outlet 26 is located on container main section 60 on container top 28. Container outlet 26 preferably extends from container main section rear end 64 towards but not completely to container main section front end 62. Moreover, container outlet 26 preferably extends fully between container sides 23 on container top 28.

The preferred embodiment of unit 10 includes a means for blocking 120 the discharge of solid fragments entrained within the steam flow from flowing out of the container 20. Preferably, the means for blocking 120 comprises a screen 122. Screen 122 completely covers container outlet 26. Screen 122 is secured to container 20 by any of a number of means known to the art, such as latches or bolts. Preferably, screen 122 is removably secured to container 20 thereby enabling easy access to the container interior 22 upon removal of the screen 122. Although screen 122 is preferably constructed from expanded metal, screen 122 may be constructed from any material that is rigid and strong enough to withstand a substantial amount of vibration and high temperature.

In the preferred embodiment, container 20 further includes a plurality of frame support members 150. Each frame support member 150 is fixedly attached to the exterior of container expanded section 40 or container main section 60. Each frame support member 150 is preferably attached to container 20 normal to center line 100. Preferably, the frame support members 150 attached to container expanded section 40 completely surround container expanded section 40. Also preferably, the frame support members 150 attached to container main section 60 at least partially surround container main section 60 and do not extend across container outlet 26. Frame support members 150 stabilize the flat common steel plates 38 of container expanded section 40 and container main section 60 thereby reducing the vibration of container 20 as steam flows therethrough. A reduction of vibration, in turn, results in a reduction of the noise level produced by the operation.

Container 20 also includes a means for diverting 90 the flow of steam within the container interior 22 from the container inlet 24 to the container outlet 26. In the preferred embodiment, means for diverting 90 comprises a plurality of deflector vanes 92 attached within the container interior 22 which act to deflect the steam flow towards the container outlet 26. The plurality of deflector vanes 92 are preferably attached one on top of the other with gaps 94 being defined vertically therebetween. Although the Figures disclose the use of three vanes 92, it is understood that any number of vanes 92 may be utilized. Gaps 94 are sized so that they are not so small as to create a back-up pressure within container 20 and so that they are not so large as to not provide sufficient deflection to the steam flow. Given these parameters, the actual size of gaps 94 depends on the size of container 20, the steam flow rate therethrough, and the size and number of deflector vanes 92.

In the preferred embodiment, the plurality of deflector vanes 92 are located within the container main section 60, preferably proximate to container expanded section 40. The plurality of deflector vanes 92 are attached within container main section 60 intermediate container expanded section 40 and container outlet 26, in the preferred embodiment. Each of the vanes 92 preferably fully extends within container interior 22 between the container sides 23. In one preferred embodiment, the plurality of vanes 92 are equally dispersed between container top 28 and container bottom 30.

Also in the preferred embodiment, each of the plurality of deflector vanes 92 is attached within the container interior 22 at a first angle 93 from horizontal ranging from 20 to 50 degrees. First angle 93 preferably measures 30 degrees from horizontal. In the preferred embodiment, deflector vanes 92 are constructed from common steel and are attached by welding to the container main section inner surface 66.

Figure 6:
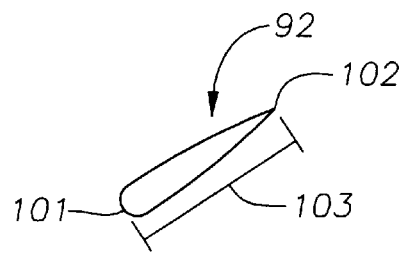
FIG. 6 is a cross-sectional view of a deflector vane.
Figure 5:
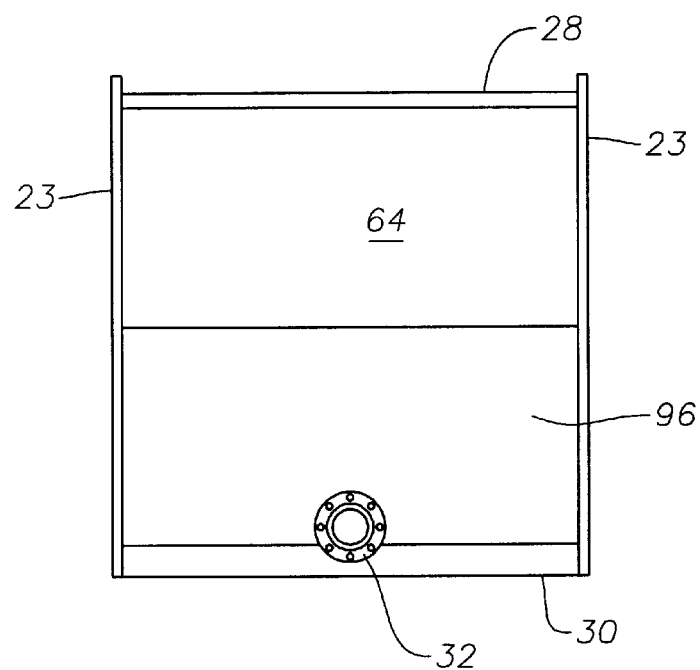
FIG. 5 is a rear elevational view of the container.

FIG. 6 illustrates the cross-sectional area of a deflector vane 92. Preferably, each deflector vane 92 includes a uniform cross-sectional area. Each deflector vane 92 includes a length 103, a vane first end 101, and a vane second end 102. Vane first end 101 is proximate container inlet 24 whereas vane second end 102 is distal container inlet 24. With vane first end 101 being preferably arcuate in shape and vane second end 102 being preferably triangular in shape, the cross-sectional shape of deflector vane 92 is similar to the cross-sectional shape of an airplane wing. Length 103 is preferably long enough to induce the necessary deflection in the steam flow. It has been found, however, that a very long length 103 generates vibration and noise as the steam contacts the deflector vane 92. Thus, a length 103 between these parameters should be chosen. Given these parameters, the actual value of length 103 depends on the size of container 20, the steam flow rate therethrough, and the size and number of gaps 94.

In the preferred embodiment, means for diverting 90 further comprises an angled rear plate 96. Angled rear plate 96 extends from container bottom 30 proximate main section rear end 64 to main section rear end 64 thereby deflecting the steam flow towards the container outlet 26.

Angled rear plate 96 is attached at a second angle 97 from horizontal ranging from 20 to 50 degrees. Second angle 97 preferably measures 45 degrees from horizontal. In the preferred embodiment, angled rear plate 96 extends fully between container sides 23.

Container 20, in the preferred embodiment, also includes a drain conduit 32. Drain conduit 32 provides fluid communication between container interior 22 and the exterior of container 20. Drain conduit 32 is preferably located proximate container bottom 30. In the preferred embodiment including angled rear plate 96, drain conduit 32 is located on angled rear plate 96 proximate container bottom 30.

IN OPERATION

In operation, container 20 is connected to pipe 12. By use of means well-known in the art, container inlet flange 25 is preferably removably connected to pipe flange 13. Once connected, container 20 is ready to absorb the high velocity steam flow from pipe 12.

As previously mentioned, the high velocity steam flow out of pipe 12 typically generates a substantial level of noise, which noise must be reduced or at least controlled for the safety of the operators. Without the use of container 20, that is, if the steam would discharge directly from the pipe 12 to the atmosphere, the noise level generated by the steam flow would be unbearable to the operators.

In general, the steam flows out of pipe 12, into container 20 through container inlet 24, through container expanded section 40, through container main section 60, and out of container 20 through container outlet 26. Importantly, the means for diverting 90 smoothly diverts the flow of the steam within container interior 22 from the container inlet 24 to the container outlet 26.

Initially, the steam flows through container expanded section 40. The key property of container expanded section 40 is that the cross-sectional area of its inner surface 42 expands, preferably gradually, from container inlet 24 to container main section 60. The expansion of cross sectional area of container expanded section 40 leads to a decrease in the velocity of the steam flowing therethrough. The decrease in velocity, in turn, reduces the noise level generated by the steam flow.

The noise level of the steam flow is also reduced by the means for diverting 90 included in the container 20. As disclosed previously, the means for diverting 90 gradually and smoothly diverts the steam flow from the container inlet 24 to the container outlet 26. In the preferred embodiment, the means for diverting 90 comprises the plurality of deflector vanes 92, preferably attached within the container interior 22 in the container main section 60 proximate container expanded section 40.

As the steam flows out of container expanded section 40 and into container main section 60, the steam reaches the plurality of deflector vanes 92. Being attached within the container interior 22 at first angle 93 (within the range of 20 to 50 degrees, and preferably 30 degrees) from horizontal, the plurality of deflector vanes 92 deflect or divert the steam flow upwards towards the container outlet 26. The cross-sectional airplane-wing-like shape of the vanes 92 as well as the measurement of first angle 93 generate a smooth transition in the steam flow towards container outlet 26.

In the preferred embodiment, means for diverting 90 also comprises an angled rear plate 96. If any steam passes through the plurality of deflector vanes 92 without being deflected or diverted upwards to the container outlet 26, such non-diverted steam ultimately reaches main section rear end 64 and angled rear plate 96. Being attached within the container interior 22 at second angle 97 (within the range of 20 to 50 degrees, and preferably 45 degrees) from horizontal, angled rear plate 96 diverts such steam upwards towards the container outlet 26.

The means for diverting 90 creates a smooth flow pattern in the steam within container interior 22 from container inlet 24 to container outlet 26. This smooth flow pattern enhances the flow characteristics and properties of the steam within container interior 22 and allows for the steam to be discharged into the atmosphere through container outlet 26 at a faster volumetric rate than in prior art systems. Importantly, the means for diverting 90 does not create a backup pressure within container 20 thereby allowing the maintenance of a high volumetric flow rate within pipe 12 and through container 20. Also of importance, the smooth flow pattern further reduces the noise level generated by the steam flow since the flow pattern ensures a minimal amount of contact between the steam and the surfaces of container 20.

It should be noted that the fact that container inlet 24, container expanded section 40, and container main section 60 each preferably has the same center line 100 also contributes to the creation of the smooth flow pattern in the steam within container interior 22. Such a unitary center line 100 design also ensures a minimal amount of contact between the steam and the surfaces of container 20.

Having been diverted upwards within container interior 22, the steam flows out of container 20 through container outlet 26. In the preferred embodiment including means for blocking 120, the means for blocking 120 blocks the discharge of most solid fragments entrained within the steam flow from flowing out of the container 20. As previously disclosed, such solid fragments may include scale or process build up which has been dislodged from the interior of the pipe 12 during the cleaning process. In the preferred embodiment including screen 122, screen 122, which is attached to container 20 and completely covers container outlet 26, prohibits the discharge of solid fragments from container outlet 26 into the atmosphere. If the screen 122 is removable, once the flow of steam is interrupted, an operator may detach screen 122 from container 20 and enter container 20 to remove any solid fragments found within container interior 22 or to clean container interior 22, etc.

As the steam flows within container 20, condensate typically forms within container interior 22 and gravitates towards container bottom 30. Such condensate then exits container 20 through drain conduit 32. A pump means may be connected to drain conduit 32 in order to aid in draining the condensate from container interior 22.

The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents.

I claim:

1. An apparatus which reduces the velocity of a high velocity discharge gas from a pipe and which releases said gas to the atmosphere, comprising:

a container defining a container interior;

said container including a container inlet through which said gas enters said container interior and a container outlet through which said gas is released to the atmosphere;

said container further including a container expanded section and a container main section;

said container expanded section intermediate said container inlet and said container main section;

said container expanded section having an inner surface cross-sectional area which expands from said container inlet to said container main section;

a plurality of deflector vanes for diverting a flow of said gas within said container interior towards said container outlet;

said container main section including an angled rear plate;

said angled rear plate oriented roughly parallel to said plurality of deflector vanes; and said angled rear plate further deflecting said flow of said gas towards said container outlet.

2. An apparatus as in claim 1, wherein:

said container including a container top;

said container outlet located on said container top; whereby said gas flow out of said container is directed upward.

3. An apparatus as in claim 1, further comprising a means for blocking the discharge of most solid fragments entrained within said gas flow from flowing out of said container interior through said container outlet.

4. An apparatus as in claim 3, wherein said screen is constructed from expanded metal.

5. An apparatus as in claim 1, wherein:

each of said plurality of deflector vanes has a first end and a second end;

said first end proximate to said container inlet and said second end distal to said container inlet;

said first end being arcuate and said second end being generally triangular, thus imparting an airfoil cross sectional shape on each of said plurality of deflector vanes.

6. An apparatus as in claim 1, wherein:

said container including a container top; and said container outlet located on said container top.

7. An apparatus as in claim 1, wherein each of said plurality of deflector vanes attached within said container interior at a first angle from horizontal ranging from 20 to 50 degrees.

8. An apparatus as in claim 7, wherein said first angle measures 30 degrees from horizontal.

9. An apparatus as in claim 1, wherein said plurality of deflector vanes located within said container main section.

10. An apparatus as in claim 9, wherein said plurality of deflector vanes located within said container main section intermediate said container expanded section and said container outlet.

11. An apparatus as in claim 1, wherein said plurality of deflector vanes attached within said container interior one on top of the other defining gaps therebetween.

12. An apparatus as in claim 1, wherein said angled rear plate extending from said container bottom to said main section rear end at a second angle from horizontal ranging in the range from 20 to 50 degrees.

13. An apparatus as in claim 12, wherein said second angle measures 45 degrees from horizontal.

14. An apparatus as in claim 1, further comprising a drain conduit providing fluid communication between said container interior and the exterior of said container.

15. An apparatus as in claim 14, wherein said drain conduit located proximate said container bottom on said angled rear plate.

16. A method for reducing high velocity gas noise and velocity, said method comprising:

inletting said high velocity gas through a container inlet into a container defining a container interior, said container including a container expanded section and a container main section, said container expanded section intermediate said container inlet and said container main section, said container expanded section having an inner cross-sectional area which expands from said container inlet to said container main section;

diverting said high velocity gas in said main section by a diverting means, said diverting means comprising a plurality of deflector vanes oriented to divert said gas toward a container outlet; and exhausting said high velocity gas through said container outlet.

17. A method as in claim 16, wherein said container outlet has a screen covering for blocking the discharge of solid fragments entrained within said high velocity gas.

18. A method as in claim 16, said diverting means further comprising:

said container including a container top, a container bottom, and an angled rear plate;

said container outlet located on said container top;

said container main section including a rear end;

said angled rear plate extending from said container bottom proximate said main section rear end upwards to said main section rear end; and said angled rear plate thereby deflecting said gas flow upward towards said container outlet.

19. A method as in claim 16, wherein:

each of said plurality of deflector vanes has a first end and a second end;

said first end proximate to said container inlet and said second end distal to said container inlet;

said first end being arcuate and said second end being triangular, thus imparting an airfoil cross sectional shape on each of said plurality of deflector vanes.

20. An apparatus that reduces the noise and velocity of a high velocity discharge steam from a pipe and which releases said steam to the atmosphere, comprising:

a container defining a container interior;

said container including a container inlet through which said steam enters said container interior and a container outlet through which said steam is released to the atmosphere;

said container further including a container expanded section and a container main section;

said container expanded section intermediate said container inlet and said container main section;

said container expanded section having an inner surface cross-sectional area that expands from said container inlet to said container main section;

a plurality of deflector vanes for diverting a flow of said steam within said container interior towards said container outlet;

said container main section including an angled rear plate;

said angled rear plate oriented roughly parallel to said plurality of deflector vanes; and said angled rear plate further deflecting said flow of said steam towards said container outlet.

21. An apparatus as in claim 20, wherein:

said container including a container top;

said container outlet located on said container top; whereby said steam flow out of said container is directed upward.

22. An apparatus as in claim 20, further comprising a means for blocking the discharge of most solid fragments entrained within said steam flow from flowing out of said container interior through said container outlet.

23. An apparatus as in claim 20, wherein:

each of said plurality of deflector vanes has a first end and a second end;

said first end proximate to said container inlet and said second end distal to said container inlet;

said first end being arcuate and said second end being generally triangular, thus imparting an airfoil cross sectional shape on each of said plurality of deflector vanes.

24. An apparatus as in claim 23, wherein said container expanded section inner surface cross-sectional area is rectangular in shape.

* * * * *